United States Patent
Sugiyama

(10) Patent No.: US 12,350,969 B2
(45) Date of Patent: Jul. 8, 2025

(54) PNEUMATIC TIRE

(71) Applicant: The Yokohama Rubber Co., LTD., Tokyo (JP)

(72) Inventor: Daichi Sugiyama, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 859 days.

(21) Appl. No.: 17/309,802

(22) PCT Filed: Dec. 18, 2019

(86) PCT No.: PCT/JP2019/049709
§ 371 (c)(1),
(2) Date: Jun. 18, 2021

(87) PCT Pub. No.: WO2020/130058
PCT Pub. Date: Jun. 25, 2020

(65) Prior Publication Data
US 2022/0055411 A1 Feb. 24, 2022

(30) Foreign Application Priority Data
Dec. 19, 2018 (JP) .................. 2018-237681

(51) Int. Cl.
*B60C 11/03* (2006.01)
(52) U.S. Cl.
CPC ...... *B60C 11/0304* (2013.01); *B60C 11/0302* (2013.01); *B60C 2011/0353* (2013.01); *B60C 2011/0365* (2013.01)

(58) Field of Classification Search
CPC .............. B60C 11/12; B60C 11/1236; B60C 11/0318; B60C 11/0304; B60C 11/03; B60C 2011/0365; B60C 2011/0353; B60C 2011/0339
See application file for complete search history.

(56) References Cited

U.S. PATENT DOCUMENTS

| 5,016,695 A * | 5/1991 | Kuze ...................... B60C 19/001 |
| | | 152/209.8 |
| 2008/0142133 A1* | 6/2008 | Ochi ........................ B60C 11/13 |
| | | 152/209.8 |
| 2012/0085471 A1 | 4/2012 | Horiguchi |
| 2012/0261044 A1 | 10/2012 | Numata |
| 2013/0112325 A1 | 5/2013 | Mukai |

(Continued)

FOREIGN PATENT DOCUMENTS

| CN | 102442164 A | 5/2012 |
| CN | 102729737 A | 10/2012 |

(Continued)

*Primary Examiner* — Cedrick S Williams
(74) *Attorney, Agent, or Firm* — Thorpe North & Western

(57) ABSTRACT

In a pneumatic tire, an outer second land portion, a center land portion, and an inner second land portion have a road contact surface that partially bulges toward the outer side in a tire radial direction from a reference contour line of a tread profile in the cross-sectional view in the tire meridian direction. Additionally, a groove width $Wg1$ of an outer shoulder main groove, a groove width $Wg3$ of an inner center main groove, and a groove width $Wg4$ of an inner shoulder main groove have a relationship of $Wg3<Wg1<Wg4$, $1.05 \leq Wg1/Wg3 \leq 1.25$, and $1.10 \leq Wg4/Wg3 \leq 1.30$.

15 Claims, 11 Drawing Sheets

(56) References Cited

U.S. PATENT DOCUMENTS

| | | | |
|---|---|---|---|
| 2014/0283965 A1* | 9/2014 | Takahashi | B60C 11/0332 |
| | | | 152/209.15 |
| 2015/0075686 A1* | 3/2015 | Suga | B60C 11/04 |
| | | | 152/209.16 |
| 2015/0210122 A1 | 7/2015 | Shimizu | |
| 2016/0144664 A1* | 5/2016 | Kimura | B60C 11/0304 |
| | | | 152/209.22 |
| 2020/0148008 A1* | 5/2020 | Nemoto | B60C 11/24 |

FOREIGN PATENT DOCUMENTS

| | | | | |
|---|---|---|---|---|
| CN | 104870221 A | | 8/2015 | |
| JP | 2006-240498 A | | 9/2006 | |
| JP | 2007168628 A | * | 7/2007 | |
| JP | 2010254049 A | * | 11/2010 | ......... B60C 11/0304 |
| JP | 2011-225105 A | | 11/2011 | |
| JP | 2012096666 A | * | 5/2012 | |
| JP | 2012-218650 A | | 11/2012 | |
| JP | 2013-224132 A | | 10/2013 | |
| JP | 2014213639 A | | 11/2014 | |
| JP | 2015-51751 A | | 3/2015 | |
| JP | 2015-182680 A | | 10/2015 | |
| JP | 2015-205660 A | | 11/2015 | |
| JP | 2016-055727 A | | 4/2016 | |
| JP | 5790876 B2 | | 2/2017 | |

* cited by examiner

|  | Conventional Example | Example 1 | Example 2 | Example 3 | Example 4 | Example 5 |
|---|---|---|---|---|---|---|
| Bulging road contact surface | Entire tread region | Center region only | Center region only | Center region only | Center region only | Center region only |
| Wg1/Wg3 | 0.30 | 1.05 | 1.15 | 1.08 | 1.13 | 1.13 |
| Wg2/Wg3 | 1.33 | 1.10 | 1.10 | 1.10 | 1.15 | 1.20 |
| Wg4/Wg3 | 1.00 | 1.10 | 1.10 | 1.10 | 1.10 | 1.10 |
| (Wg2 − Wg1)/Wg3 | 1.03 | 0.05 | −0.05 | 0.02 | 0.02 | 0.07 |
| D11/Wr1 | 1.00 | 1.00 | 1.00 | 1.00 | 1.00 | 1.00 |
| W11_min (mm) | 3.0 | 3.0 | 3.0 | 3.0 | 3.0 | 3.0 |
| W11_max/W11_min | 1.60 | 1.60 | 1.60 | 1.60 | 1.60 | 1.60 |
| W11/W52 | 1.20 | 1.20 | 1.20 | 1.20 | 1.20 | 1.20 |
| First second lug groove of outer second land portion | No | No | No | No | No | No |
| Circumferential narrow groove of inner second land portion | No | No | No | No | No | No |
| Circumferential narrow groove of inner shoulder land portion | No | No | No | No | No | No |
| W51/Wg3 | - | - | - | - | - | - |
| Wet Braking performance | 100 | 101 | 102 | 101 | 102 | 102 |
| Dry steering stability performance | 100 | 101 | 101 | 101 | 101 | 101 |
| Noise performance | 100 | 101 | 100 | 101 | 101 | 102 |

FIG. 11A

|  | Example 6 | Example 7 | Example 8 | Example 9 | Example 10 | Example 11 | Example 12 |
|---|---|---|---|---|---|---|---|
| Bulging road contact surface | Center region only | Center region only | Center region only | Center region only | Center region only | Center region only | Center region only |
| Wg1/Wg3 | 1.13 | 1.13 | 1.13 | 1.13 | 1.13 | 1.13 | 1.13 |
| Wg2/Wg3 | 1.25 | 1.25 | 1.25 | 1.25 | 12.5 | 1.25 | 1.25 |
| Wg4/Wg3 | 1.11 | 1.11 | 1.20 | 1.20 | 1.20 | 1.20 | 1.20 |
| (Wg2 - Wg1)/Wg3 | 0.12 | 0.12 | 0.12 | 0.12 | 0.12 | 0.12 | 0.12 |
| D11/Wr1 | 1.00 | 1.00 | 1.00 | 0.70 | 0.80 | 0.80 | 0.80 |
| W11_min (mm) | 3.0 | 3.0 | 3.0 | 3.0 | 3.0 | 2.5 | 1.5 |
| W11_max/W11_min | 1.60 | 1.60 | 1.60 | 1.60 | 1.60 | 1.60 | 1.60 |
| W11/W52 | 1.20 | 1.20 | 1.20 | 1.20 | 1.20 | 1.20 | 1.20 |
| First second lug groove of outer second land portion | No | No | No | No | No | No | No |
| Circumferential narrow groove of inner second land portion | No | No | No | No | No | No | No |
| Circumferential narrow groove of inner shoulder land portion | No | No | No | No | No | No | No |
| W51/Wg3 | - | - | - | - | - | - | - |
| Wet Braking performance | 102 | 103 | 103 | 102 | 102 | 102 | 101 |
| Dry steering stability performance | 101 | 101 | 101 | 101 | 101 | 101 | 101 |
| Noise performance | 102 | 102 | 103 | 104 | 104 | 105 | 105 |

FIG. 11B

| | Example 13 | Example 14 | Example 15 | Example 16 | Example 17 | Example 18 | Example 19 |
|---|---|---|---|---|---|---|---|
| Bulging road contact surface | Center region only | Center region only | Center region only | Center region only | Center region only | Center region only | Center region only |
| Wg1/Wg3 | 1.13 | 1.13 | 1.13 | 1.13 | 1.13 | 1.13 | 1.13 |
| Wg2/Wg3 | 1.25 | 1.25 | 1.25 | 1.25 | 1.25 | 1.25 | 1.25 |
| Wg4/Wg3 | 1.20 | 1.20 | 1.20 | 1.20 | 1.20 | 1.20 | 1.20 |
| (Wg2 - Wg1)/Wg3 | 0.12 | 0.12 | 0.12 | 0.12 | 0.12 | 0.12 | 0.12 |
| D11/Wr1 | 0.80 | 0.80 | 0.80 | 0.80 | 0.80 | 0.80 | 0.80 |
| W11_min (mm) | 1.5 | 1.5 | 1.5 | 1.5 | 1.5 | 1.5 | 1.5 |
| W11_max/W11_min | 1.60 | 1.00 | 1.00 | 1.00 | 1.00 | 1.00 | 1.00 |
| W11/W52 | 1.20 | 1.20 | 1.05 | 1.00 | 1.00 | 1.00 | 1.00 |
| First second lug groove of outer second land portion | No | No | No | No | Yes | Yes | Yes |
| Circumferential narrow groove of inner second land portion | No | No | No | No | No | Yes | Yes |
| Circumferential narrow groove of inner shoulder land portion | No | No | No | No | No | No | Yes |
| W51/Wg3 | - | - | - | - | - | - | 0.20 |
| Wet Braking performance | 101 | 101 | 101 | 101 | 101 | 102 | 102 |
| Dry steering stability performance | 101 | 101 | 101 | 101 | 101 | 101 | 101 |
| Noise performance | 106 | 106 | 106 | 106 | 105 | 105 | 105 |

FIG. 11C

PNEUMATIC TIRE

TECHNICAL FIELD

The technology relates to a pneumatic tire and particularly relates to a pneumatic tire with improved wet performance and dry steering stability performance.

BACKGROUND ART

In recent pneumatic tires, in order to improve the dry performance of the tire, a land portion of a tread portion includes a road contact surface that partially bulges toward the outer side in a tire radial direction from a reference contour line of a tread profile. The technology described in Japan Patent No. 5790876 is a conventional pneumatic tire that is configured in this manner.

SUMMARY

The technology provides a pneumatic tire with improved wet performance and dry performance.

A pneumatic tire according to an embodiment of the technology is a pneumatic tire having an indicator designating a mounting direction with respect to a vehicle, the pneumatic tire including: an outer shoulder main groove, an outer center main groove, an inner center main groove, and an inner shoulder main groove extending in a tire circumferential direction; and an outer shoulder land portion, an outer second land portion, a center land portion, an inner second land portion, and an outer shoulder land portion defined by the main grooves, the outer second land portion, the center land portion, and the inner second land portion including a road contact surface that partially bulges toward an outer side in a tire radial direction from a reference contour line of a tread profile in a cross-sectional view in a tire meridian direction, and a groove width $Wg1$ of the outer shoulder main groove, a groove width $Wg3$ of the inner center main groove, and a groove width $Wg4$ of the inner shoulder main groove having a relationship of $Wg3<Wg1<Wg4$, $1.05 \leq Wg1/Wg3 \leq 1.25$, and $1.10 \leq Wg4/Wg3 \leq 1.30$.

In the pneumatic tire according to an embodiment of the technology, (1) since the land portion of the tread portion center region includes the bulging road contact surface, the ground contact pressure in the tread portion center region increases. As a result, the grounding characteristics between the road contact surface of the land portion and the road surface during traveling on wet road surfaces are improved, and the wet performance of the tire is improved. Further, (2) since the groove width $Wg3$ of the inner center main groove is narrow, the rigidity of the land portion in the inner region in the tire width direction is ensured, and the steering stability performance of the tire on dry road surfaces is improved. On the other hand, since the groove width $Wg4$ of the inner shoulder main groove is wide, drainage properties in the inner region in the tire width direction are ensured, and the wet performance of the tire is ensured. Due to (1) and (2) described above, an advantage that the wet performance and the dry steering stability performance of the tire are improved in a compatible manner is obtained.

BRIEF DESCRIPTION OF DRAWINGS

FIGS. 11A-11C are tables indicating the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
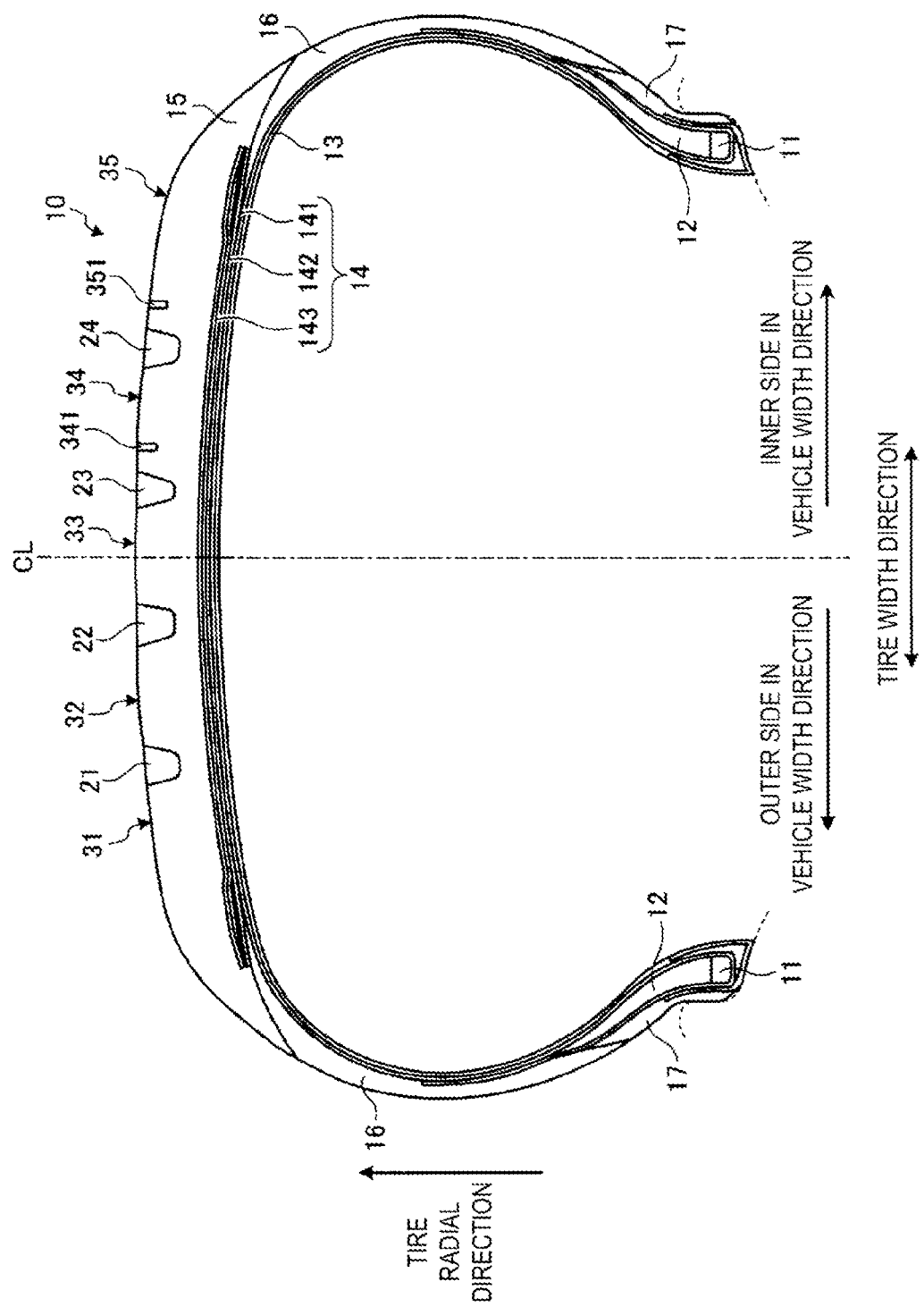
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in a tire radial direction. FIG. 1 also illustrates a radial tire for a passenger vehicle as an example of a pneumatic tire.

In the same drawing, a cross section in the tire meridian direction is defined as a cross section of the tire taken along a plane that includes a tire rotation axis (not illustrated). Additionally, a tire equatorial plane CL is defined as a plane that is perpendicular to the tire rotation axis and that extends through a midpoint between measurement points of a tire cross-sectional width defined by JATMA. Additionally, a tire width direction refers to a direction parallel with the tire rotation axis. The tire radial direction refers to a direction perpendicular to the tire rotation axis.

Furthermore, an inner side in a vehicle width direction and an outer side in the vehicle width direction are defined with respect to the vehicle width direction in a case where the tire is mounted on a vehicle. Additionally, left and right regions demarcated by the tire equatorial plane are defined as an outer region in a vehicle width direction and an inner region in the vehicle width direction. Further, the pneumatic tire includes a mounting direction indicator portion (not illustrated) that indicates the tire mounting direction with respect to a vehicle. The mounting direction indicator portion, for example, is composed of a mark or recesses/protrusions on a sidewall portion of the tire. For example, Economic Commission for Europe Regulation 30 (ECE R30) stipulates that the vehicle mounting direction indicator portion be provided on the sidewall portion on the outer side in the vehicle width direction in a case where the tire is mounted on a vehicle.

A pneumatic tire 1 has an annular structure with the tire rotation axis as its center and includes: a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 includes one or a plurality of bead wires made of steel and wound multiple times in an annular shape, and are embedded in bead portions to form cores of left and right bead portions. The pair of bead fillers 12, 12 are respectively disposed on a periphery of the pair of bead cores 11, 11 in the tire radial direction and reinforce the bead portions.

The carcass layer 13 has a single layer structure made of one carcass ply or a multilayer structure made by layering a plurality of carcass plies and extends between the left and right bead cores 11, 11 in a toroidal shape, forming the framework of the tire. Additionally, both end portions of the carcass layer 13 are turned back toward an outer side in the tire width direction so as to wrap around the bead cores 11 and the bead fillers 12 and fixed. Additionally, the carcass ply of the carcass layer 13 is made by performing rolling processing on a plurality of carcass cords made of steel or an organic fiber material (e.g. aramid, nylon, polyester, rayon, or the like) and covered with coating rubber. The carcass ply has a cord angle (defined as the inclination angle of a longitudinal direction of the carcass cords with respect to a tire circumferential direction) of 80° or more and 100° or less.

The belt layer 14 is a multilayer structure including a plurality of belt plies 141 to 143 and is disposed around the periphery of the carcass layer 13. The belt plies 141 to 143 include a pair of cross belts 141 and 142 and a belt cover 143.

The pair of cross belts 141 and 142 is made by performing a rolling process on coating rubber-covered belt cords made from steel or an organic fiber material. The cross belts 141 and 142 have a cord angle, as an absolute value, of 15° or more and 55° or less. Furthermore, the pair of cross belts 141 and 142 have cord angles (defined as the inclination angle in the longitudinal direction of the belt cords with respect to the tire circumferential direction) of opposite signs and are stacked so that the longitudinal directions of the belt cords intersect each other (a so-called crossply structure). Additionally, the pair of cross belts 141 and 142 are disposed to be stacked on the outer side of the carcass layer 13 in the tire radial direction.

The belt cover 143 is made by coating belt cover cords made from steel or an organic fiber material with a coating rubber and has a cord angle, as an absolute value, of 0° or more and 10° or less. Additionally, the belt cover 143 is, for example, a strip material formed by coating one or a plurality of belt cover cords with coating rubber, where the strip material is formed by winding the strip material spirally on the outer circumferential surfaces of the cross belts 141 and 142 multiple times in the tire circumferential direction.

The tread rubber 15 is disposed on the outer circumference of the carcass layer 13 and the belt layer 14 in the tire radial direction and constitutes a tread portion of the tire. The pair of sidewall rubbers 16, 16 are disposed on the outer side in the tire width direction of the carcass layer 13 and constitute left and right sidewall portions. The pair of rim cushion rubbers 17, 17 extend from an inner side in the tire radial direction of the left and right bead cores 11, 11 and turned back portions of the carcass layer 13 in an outer side in the tire width direction and constitute rim fitting surfaces of the bead portions.

Tread Pattern

Figure 2:
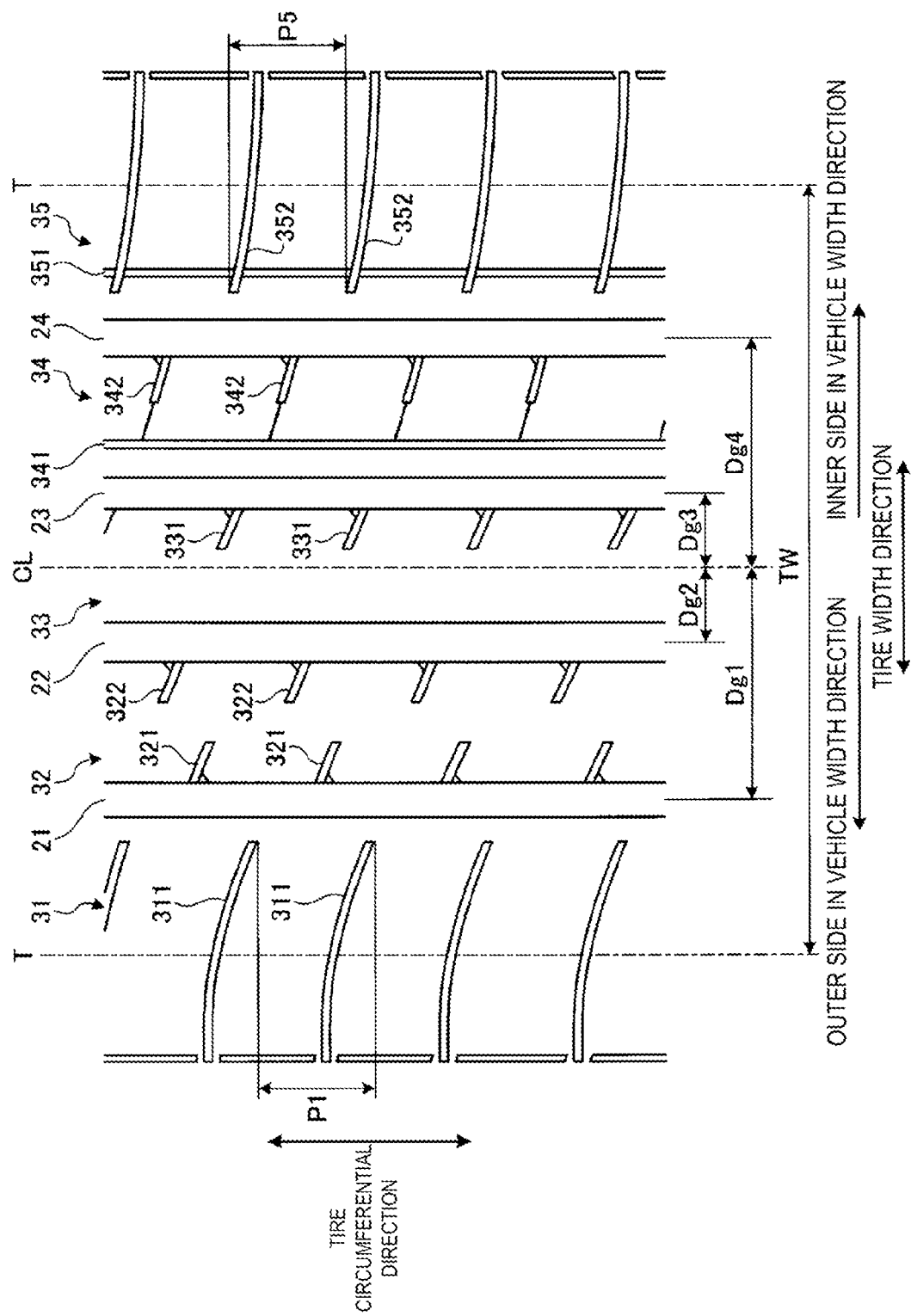
FIG. 2 is a plan view illustrating a tread surface of the pneumatic tire illustrated in FIG. 1.

FIG. 2 is a plan view illustrating a tread surface of the pneumatic tire illustrated in FIG. 1. FIG. 2 illustrates a tread surface of an all-season tire. In reference to the same drawing, "tire circumferential direction" refers to the direction revolving about the tire rotation axis. Reference sign T denotes a tire ground contact edge, and a dimension symbol TW denotes a tire ground contact width.

As illustrated in FIG. 2, the pneumatic tire 1 includes a plurality of circumferential main grooves 21 to 24 extending in the tire circumferential direction and a plurality of land portions 31 to 35 defined by the circumferential main grooves 21 to 24, the circumferential main grooves 21 to 24 and the land portions 31 to 35 being provided in a tread surface.

"Main groove" refers to a groove on which a wear indicator is provided as specified by JATMA and has a groove width of 7.4 mm or more and 10.2 mm or less and a groove depth of 8.1 mm or more and 8.7 mm or less. Lug grooves described later are lateral grooves extending in the tire width direction and opening when the tire comes into contact with the ground to function as grooves. Additionally, sipes described below are notches formed in the tread contact surface and the sipes close when the tire comes into contact with the ground.

The groove width is measured as a distance between opposing groove walls at a groove opening portion when the tire is mounted on a specified rim, inflated to a specified internal pressure, and in an unloaded state. In a configuration in which a notch portion or a chamfered portion is formed in a groove opening portion, the groove width is measured with reference to the intersection points between an extension line of the tread contact surface and extension lines of the groove walls as measurement points, in a cross-sectional view in the groove width direction and the groove depth direction.

The groove depth is the distance from the tread contact surface to the groove bottom and is measured when the tire is mounted on a specified rim, inflated to the specified internal pressure, and in an unloaded state. Additionally, in a configuration in which the grooves include a partially uneven portion or sipe on the groove bottom, the groove depth is measured excluding these portions.

"Specified rim" refers to a "standard rim" defined by JATMA (The Japan Automobile Tyre Manufacturers Association, Inc.), a "design rim" defined by TRA (The Tire and Rim Association, Inc.), or a "measuring rim" defined by ETRTO (The European Tyre and Rim Technical Organisation). Additionally, "specified internal pressure" refers to a "maximum air pressure" defined by JATMA, to the maximum value in "tire load limits at various cold inflation pressures" defined by TRA, or to "inflation pressures" defined by ETRTO. Additionally, "specified load" refers to a "maximum load capacity" defined by JATMA, the maximum value in "tire load limits at various cold inflation pressures" defined by TRA, or "load capacity" defined by ETRTO. However, in JATMA, in a case of a tire for a passenger vehicle, the specified internal pressure is an air pressure of 180 kPa, and the specified load is 88% of the maximum load capacity at the specified internal pressure.

Furthermore, in the configuration of FIG. 2, the left and right regions demarcated by the tire equatorial plane CL each have two circumferential main grooves 21, 22; 23, 24. These circumferential main grooves 21 to 24 are disposed in left-right symmetry with respect to the tire equatorial plane CL. Five land portions 31 to 35 are defined by the circumferential main grooves 21 to 24. In addition, one land portion 33 is disposed on the tire equatorial plane CL.

However, no such limitation is intended, and five or more circumferential main grooves may be disposed, or the circumferential main grooves may be arranged in left-right asymmetry with respect to the tire equatorial plane CL as the center (not illustrated). In addition, the land portion may be arranged at a position away from the tire equatorial plane CL, with one circumferential main groove being arranged on the tire equatorial plane CL (not illustrated).

The region on the tire equatorial plane CL side is defined as the center region with the left and right outermost circumferential main grooves 21 and 24 as the boundary, and the left and right regions on the tire ground contact edge T side are defined as shoulder regions.

Additionally, in the state where the tire is mounted on a vehicle illustrated in FIG. 2, the circumferential main groove 21 on the outermost side in the vehicle width direction is defined as an outer shoulder main groove, and the circumferential main groove 22 adjacent to the outer shoulder main groove 21 is defined as an outer center main groove. Additionally, the circumferential main groove 24 on the innermost side in the vehicle width direction is defined as an inner shoulder main groove, and the circumferential main groove 23 adjacent to the inner shoulder main groove 24 is defined as an inner center main groove.

For example, in the configuration of FIG. 2, the distances Dg1 and Dg4 from the tire equatorial plane CL to groove center lines of the outer and inner shoulder main grooves 21 and 24 are in the range of 26% or more and 32% or less of a tire ground contact width TW. Further, the distances from the tire equatorial plane CL to the groove center lines of the outer and inner center main grooves 22 and 23 are in the range of 8% or more and 12% or less of the tire ground contact width TW.

The groove center line is defined as an imaginary line connecting the midpoints of the distance between the left and right groove walls. The distance to the groove center line in a case where the groove center line of the main groove has a zigzag shape or a wave-like shape is measured using a straight line parallel to the tire circumferential direction passing through midpoints of the maximum amplitude positions on the left and right of the groove center line as the measurement point.

The tire ground contact width TW is measured as the maximum linear distance in the tire axial direction of a contact surface between the tire and a flat plate when the tire is mounted on a specified rim, inflated to a specified internal pressure, placed perpendicular to the flat plate in a static state, and loaded with a load corresponding to a specified load.

The tire ground contact edge T is defined as a maximum width position in the tire axial direction of the contact surface between the tire and a flat plate when the tire is mounted on a specified rim, inflated to a specified internal pressure, placed perpendicular to the flat plate in a static state, and loaded with a load corresponding to a specified load.

In FIG. 2, the land portion 31 on the outer side in the tire width direction defined by the outer shoulder main groove 21 is defined as an outer shoulder land portion, and the land portion 32 on the inner side in the tire width direction is defined as an outer second land portion. Further, the land portion 34 on the outer side in the tire width direction defined by the inner shoulder main groove 24 is defined as an inner shoulder land portion, and the land portion 34 on the inner side in the tire width direction is defined as an inner second land portion. Additionally, the land portion 33 disposed between the outer and inner second land portions 32 and 34 is defined as a center land portion. In a configuration (not illustrated) provided with five or more circumferential main grooves, two or more rows of center land portions are defined.

Bulging Profile

Figure 3:
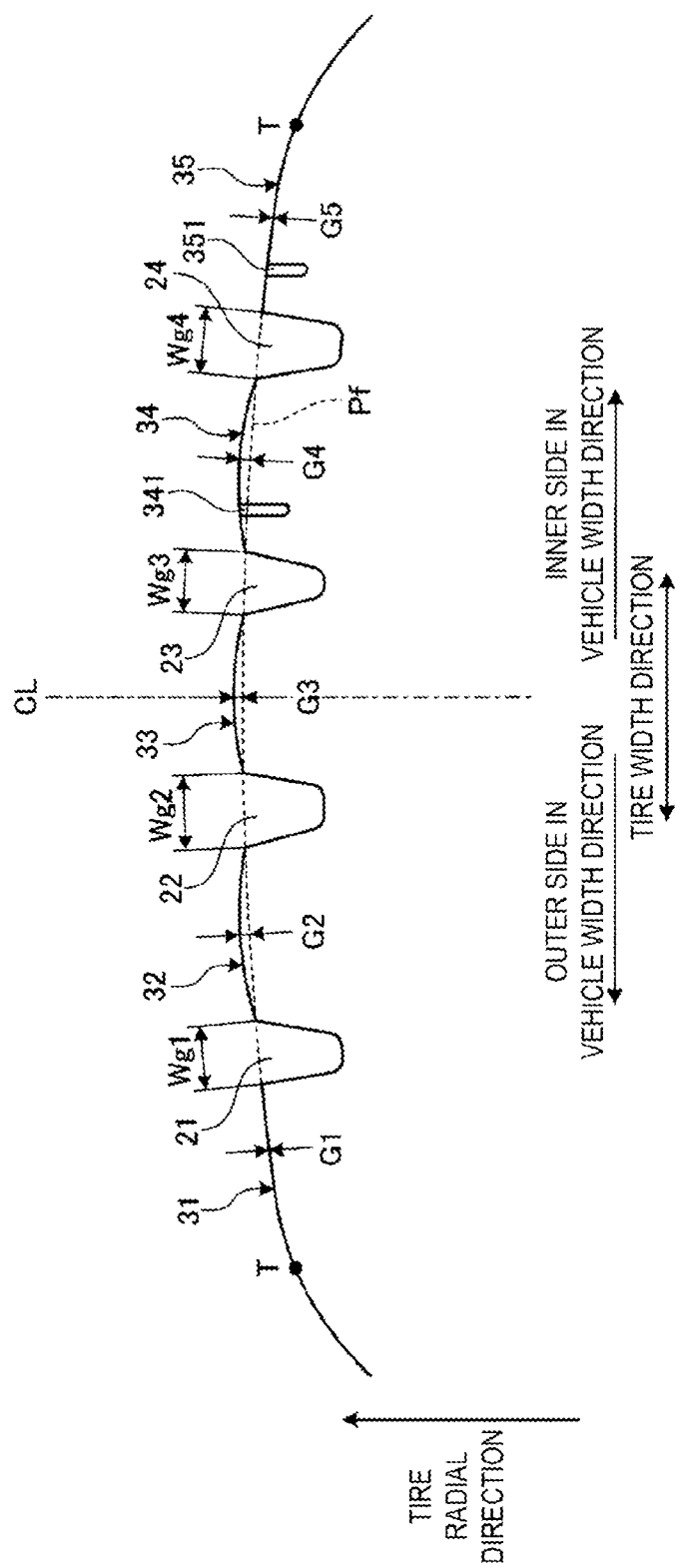
FIG. 3 is an explanatory diagram illustrating a tread profile of the pneumatic tire illustrated in FIG. 1.

FIG. 3 is an explanatory diagram illustrating a tread profile of the pneumatic tire illustrated in FIG. 1. FIG. 3 illustrates the bulging road contact surface of the land portions 32 to 34 in an exaggerated manner.

As illustrated in FIG. 3, the tread profile (reference sign omitted in the drawing) is a so-called bulging profile, and the land portions 32 to 34 in the tread portion center region have a road contact surface that partially bulges toward the outer side in the tire radial direction from the reference contour line Pf of the tread profile in a cross-sectional view in the tire meridian direction.

A tread profile is a contour line of the tread surface in a cross-sectional view along the tire meridian direction, and is measured using a laser profiler in an unloaded state with the tire mounted on a specified rim and inflated to the specified internal pressure. The laser profiler used may be, for example, a tire profile measuring device (available from Matsuo Co., Ltd.).

The reference contour line of the tread profile is defined as a smooth curve extending continuously in the ground contact region of the tread portion. Specifically, the reference contour line is defined by a curve formed by combining a plurality of arcs having two or three types of radii of curvature, or by a continuous function such as an elliptical function, a cycloid function, an involute function, or a power function.

In the configuration described above, since the land portions 32 to 34 in the tread portion center region have the bulging road contact surface, the ground contact pressure in the tread portion center region increases. Thus, the grounding characteristics between the road contact surfaces of the land portions 32 to 34 and the road surface during traveling on wet road surfaces are improved, and the wet performance of the tire is improved.

Additionally, the bulging amounts G2 to G4 of the bulging road contact surfaces of the land portions 32 to 34 in the tread portion center region have a relationship of $0.003 \leq G2/Wr2 \leq 0.020$, $0.003 \leq G3/Wr3 \leq 0.020$, and $0.003 \leq G4/Wr4 \leq 0.020$ for the widths Wr2 to Wr4 of the land portions 32 to 34. Further, the bulging amounts G2 to G4 of the road contact surfaces are preferably in the range of 0.1 mm or more and 0.5 mm or less, and are more preferably in the range of 0.2 mm or more and 0.4 mm or less. Due to the lower limit, the effect of increasing the ground contact pressure of the land portions 32 to 34 due to the bulging road contact surface is properly ensured. Due to the upper limit, an excessive ground contact pressure difference between the center portion and the edge portion of the land portions 32 to 34 is suppressed.

The bulging amount of the road contact surface is measured as the maximum distance from the reference contour line of the tread profile to the maximum bulging point of the road contact surface of the land portion.

The width of the land portion is measured as the distance in the tire width direction between the measurement points of the groove width of the left and right circumferential main grooves defining the land portion when the tire is mounted on a specified rim, inflated to the specified internal pressure, and in an unloaded state.

Additionally, the distance from one edge portion of each of the land portions 32 to 34 to the maximum bulging position of the road contact surface is preferably in the range of from 40% to 60% with respect to the widths Wr2 to Wr4 of the land portions 32 to 34. Accordingly, the maximum bulging position of the road contact surface is disposed at the center portion of the width of the land portions 32 to 34.

Additionally, the bulging amount G2 of the outer second land portion 32 preferably has a relationship of $0.90 \leq G2/G4 \leq 1.10$ with respect to the bulging amount G4 of the inner second land portion 34. Therefore, the bulging amounts G2 and G4 of the left and right second land portions 32 and 34 defined by the outermost circumferential main grooves 21 and 24 are preferably substantially equal.

For example, in the configuration of FIG. 3, all the land portions 32 to 34 in the tread portion center region have the bulging road contact surface. Further, the road contact surfaces of the land portions 32 to 34 bulge in an arc shape across the entire region in the width direction of the land portions 32 to 34. Additionally, the left and right edge portions of each of the land portions 32 to 34 are on the reference contour line Pf of the tread profile. Note that in the configuration in which a notch portion or a chamfered portion is formed in the edge portion of the land portions 32 to 34, the intersection point between the extension line of the road contact surface of the land portion and the extension line of the groove wall the main groove is defined as the edge portion of the land portion.

On the other hand, the land portions 31 and 35 in the tread portion shoulder region do not have the bulging road contact surface. Specifically, the contour lines of the road contact surfaces of the outer shoulder land portion 31 and the inner shoulder land portion 35 coincide with the reference contour line Pf of the tread profile. As a result, the bulging amounts G1 and G5 of the road contact surfaces of the land portions 31 and 35 are G1=G5=0 mm. However, no such limitation is intended, and the outer shoulder land portion 31 and the inner shoulder land portion 35 may have a road contact surface that bulges from the reference contour line Pf (not illustrated).

Groove Width of Main Groove

In FIG. 3, the groove width Wg1 of the outer shoulder main groove 21, the groove width Wg3 of the inner center main groove 23, and the groove width Wg4 of the inner shoulder main groove 24 have a relationship of Wg3<Wg1<Wg4. Therefore, the groove width Wg3 of the inner center main groove 23 is the narrowest. Additionally, the groove widths Wg1 and Wg4 preferably have a relationship of $0.01 \leq (Wg4-Wg1)/Wg3$. Additionally, the groove width ratio Wg1/Wg3 preferably has a relationship of $1.05 \leq Wg1/Wg3 \leq 1.25$, and more preferably has a relationship of $1.05 \leq Wg1/Wg3 \leq 1.15$. Additionally, the groove width ratio Wg4/Wg3 preferably has a relationship of $1.10 \leq Wg4/Wg3 \leq 1.30$, and more preferably has a relationship of $1.10 \leq Wg4/Wg3 \leq 1.20$.

In the configuration described above, since the groove width Wg3 of the inner center main groove 23 is narrow, the rigidity of the land portions 33 and 34 in the inner region in the tire width direction is ensured, and the steering stability performance of the tire on dry road surfaces is improved. On the other hand, since the groove width Wg4 of the inner shoulder main groove 24 is large, and the inner second land portion 34 includes a circumferential narrow groove 341 described below, drainage properties in the inner region in the tire width direction are ensured, and the wet performance of the tire is ensured.

Further, it is preferable that the groove width Wg2 of the outer center main groove 22 has a relationship of Wg1<Wg2 with respect to the groove width Wg1 of the outer shoulder main groove 21. Additionally, the groove widths Wg1, Wg2, and Wg3 preferably have a relationship of $0.01 \leq (Wg2-Wg1)/Wg3$. Further, the groove width Wg2 of the outer center main groove 22 preferably has a relationship of $1.05 \leq Wg2/Wg3 \leq 1.40$ with respect to the groove width Wg3 of the inner center main groove 23, and more preferably has a relationship of $1.06 \leq Wg2/Wg3 \leq 1.25$.

In the configuration described above, since the groove width Wg2 of the outer center main groove 22 is wider than the groove width Wg1 of the outer shoulder main groove 21 on the outermost side in the vehicle width direction (Wg1<Wg2), and is wider than the groove width Wg3 of the inner center main groove 23 (Wg3<Wg2), the pass-by noise of the vehicle is reduced as compared with the configuration in which the outer center main groove 22 has a narrow structure.

Additionally, the groove width Wg2 of the outer center main groove 22 preferably has a relationship of Wg4<Wg2 with respect to the groove width Wg4 of the inner shoulder main groove 24. In other words, it is most preferable that the groove widths of the four main grooves 21 to 24 have a relationship of Wg3<Wg1<Wg4<Wg2. Therefore, it is preferable that the groove width Wg3 of the inner center main groove 23 is the narrowest, and the groove width Wg2 of the outer center main groove 22 is the widest. Additionally, it is preferable that the groove widths of the four main grooves 21 to 24 are different from each other. However, no such limitation is intended, and at least the relationships of Wg3<Wg1<Wg4 and Wg3<Wg1<Wg2 may be satisfied.

Outer Region in Vehicle Width Direction

Figure 4:
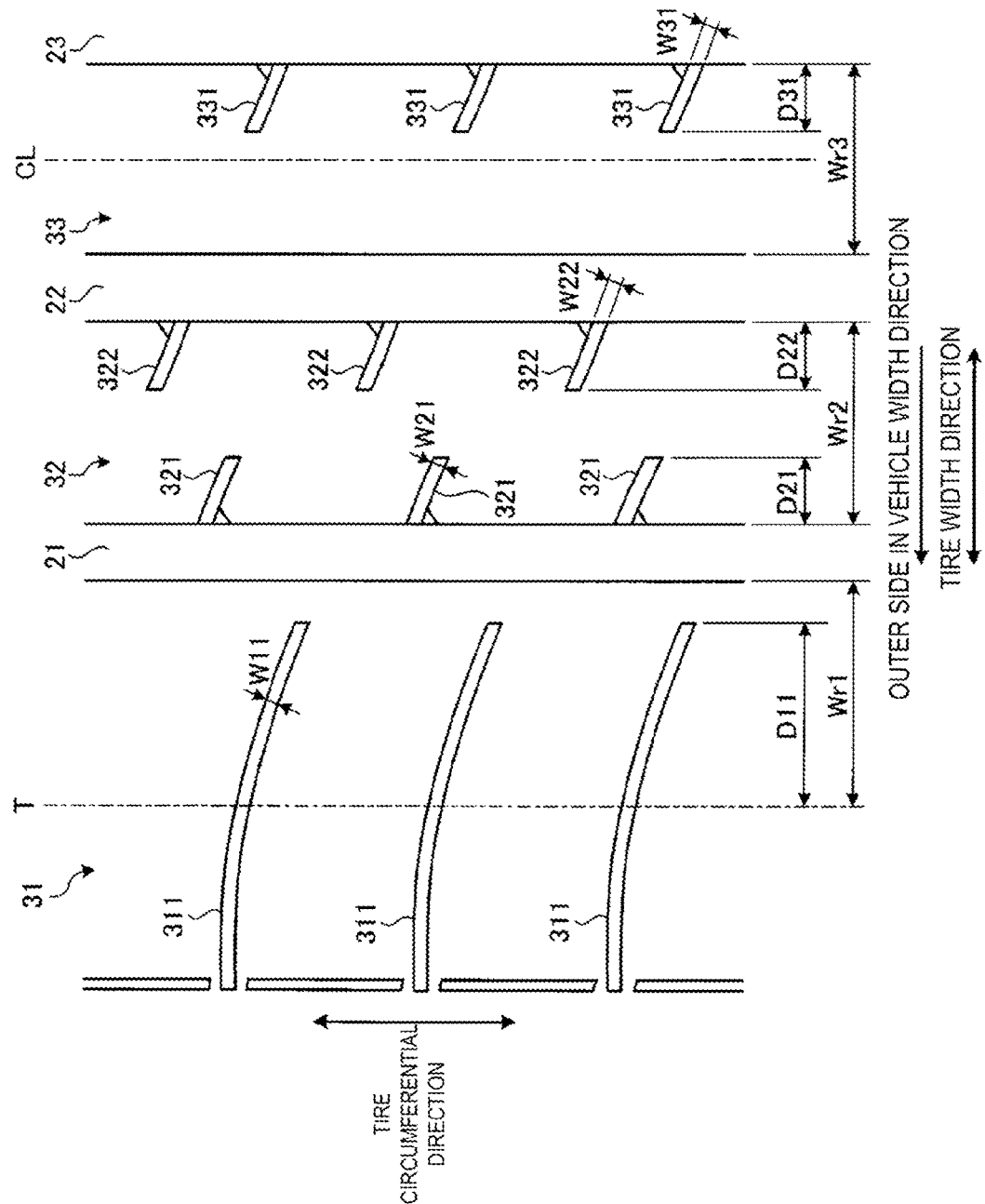
FIG. 4 is an enlarged view illustrating an outer region of the pneumatic tire illustrated in FIG. 2 in the vehicle width direction.

FIG. 4 is an enlarged view illustrating the outer region in the vehicle width direction of the pneumatic tire illustrated in FIG. 2. FIG. 4 illustrates the outer shoulder land portion 31, the outer second land portion 32, and the center land portion 33.

As illustrated in FIG. 4, the outer shoulder land portion 31 includes an outer shoulder lug groove 311. The outer shoulder lug groove 311 terminates inside the outer shoulder land portion 31 at one end and extends beyond the tire ground contact edge T in the tire width direction. In such a configuration, since the outer shoulder lug groove 311 does not pass through the outer shoulder land portion 31, the pass-by noise of the vehicle is reduced. Additionally, the groove width W11 of the outer shoulder lug groove 311 is in the range of $1.5 \text{ mm} \leq W11 \leq 4.0 \text{ mm}$, and the groove depth H11 (dimension symbol omitted in the drawing) is in the range of $5.9 \text{ mm} \leq H11 \leq 6.5 \text{ mm}$. Therefore, the outer shoulder lug groove 311 is a so-called narrow groove. Additionally, the edge portion on the outer shoulder main groove 21 side of the outer shoulder land portion 31 has a plain structure that is not divided into lug grooves or sipes.

Further, the distance D11 from the tire ground contact edge T to the terminating end portion of the outer shoulder lug groove 311 preferably has a relationship of $0.70 \leq D11/Wr1 \leq 0.90$ with respect to the width Wr1 of the outer shoulder land portion 31 and more preferably has a relationship of $0.75 \leq D11/Wr1 \leq 0.85$. As a result, the effect of improving the drainage properties of the outer shoulder lug groove 311 is ensured, and the rigidity of the edge portion of the outer shoulder land portion 31 on the outer shoulder main groove 21 side is ensured.

The distance from the edge portion of the land portion to the terminating end portion of the lug groove is measured as the maximum value of the extension length of the lug groove in the tire width direction.

The outer second land portion 32 is a single rib that is not divided in the tire width direction, and has a road contact surface continuous in the tire circumferential direction. Further, the outer second land portion 32 includes first and second outer second lug grooves 321 and 322.

The first outer second lug groove 321 opens to the outer shoulder main groove 21 at one end and terminates in the outer second land portion 32 at the other end. The groove width W21 of the first outer second lug groove 321 is in the range of 1.6 mm or more and 3.0 mm or less, and the groove depth (dimension symbol omitted in the drawing) is in the range of 5.9 mm or more and 6.5 mm or less.

Additionally, the distance D21 from an edge portion on the outer side in the tire width direction of the outer second land portion 32 to the terminating end portion of the first outer second lug groove 321 preferably has a relationship of $0.20 \leq D21/Wr2 \leq 0.50$ with respect to the width Wr2 of the outer second land portion 32 and more preferably has a relationship of $0.25 \leq D21/Wr2 \leq 0.40$.

The second outer second lug groove 322 opens to the outer center main groove 22 at one end and terminates in the outer second land portion 32 at the other end. Further, the groove width W42 of the second outer second lug groove 322 is in the range of 1.6 mm or more and 3.0 mm or less, and the groove depth (dimension symbol omitted in the drawing) is in the range of 5.9 mm or more and 6.5 mm or less. Further, the groove width W22 of the second outer second lug groove 322 has a relationship of $0.90 \leq W22/W21 \leq 1.10$ with respect to the groove width W21 of the first outer second lug groove 321. Thus, the first and second outer second lug grooves 321 and 322 have substantially the same groove widths W21 and W22.

Additionally, the distance D22 from an edge portion on the tire equatorial plane CL side of the outer second land portion 32 to the terminating end portion of the second outer second lug groove 322 preferably has a relationship of $0.20 \leq D22/Wr2 \leq 0.50$ with respect to the width Wr2 of the outer second land portion 32 and more preferably has a relationship of $0.25 \leq D22/Wr2 \leq 0.40$. Further, the distance D22 of the second outer second lug groove 322 has a relationship of $0.90 \leq D22/D21 \leq 1.10$ with respect to the distance D21 of the first outer second lug groove 321. Thus, the first and second outer second lug grooves 321 and 322 have substantially the same distance D21 and D22.

The center land portion 33 is a single rib that is not divided in the tire width direction and has a road contact surface continuous in the tire circumferential direction. Further, the center land portion 33 includes a center lug groove 331. Additionally, the edge portion on the outer side in the vehicle width direction of the center land portion 33 has a plain structure that is not divided into lug grooves or sipes.

The center lug groove 331 opens to the inner center main groove 23 at one end and terminates in the center land portion 33 at the other end.

Additionally, the groove width W31 of the center lug groove 331 is in the range of 1.5 mm or more and 2.8 mm or less, and the groove depth (dimension symbol omitted in the drawings) is in the range of 5.9 mm or more and 6.5 mm or less.

Additionally, the distance D31 from the edge portion on the inner side in the vehicle width direction of the center land portion 33 to the terminating end portion of the center lug groove 331 preferably has a relationship of $0.25 \leq D31/Wr3 \leq 0.50$ with respect to the width Wr3 of the center land portion 33, and more preferably has a relationship $0.30 \leq D31/Wr3 \leq 0.40$.

In the configuration described above, since the land portions (the outer second land portion 32 and the center land portion 33) on the outer side in the vehicle width direction from the tire equatorial plane CL among the land portions 32 to 34 in the tread portion center region are single ribs that are not divided in the tire width direction, the rigidity of the land portions 32 and 33 on the outer side in the vehicle width direction, which receive a large load during turning on dry road surfaces is ensured. Thus, the steering stability performance of the tire is ensured.

As illustrated in FIG. 4, the lug groove 311 of the outer shoulder land portion 31, the lug grooves 321 and 322 of the outer second land portion 32, and the lug groove 331 of the center land portion 33 are inclined in the same direction with respect to the tire circumferential direction. In the same drawing, all the lug grooves 311, 321, 322, and 331 extend in a state of being inclined downward to the right.

The inclination angle of the lug grooves is measured as the inclination angle, with respect to the tire circumferential direction, of the straight line passing through the intersection point between the groove center line of the lug groove and both end portions in the longitudinal direction of the lug groove in the tire ground contact surface.

Inner Region in Vehicle Width Direction

Figure 5:
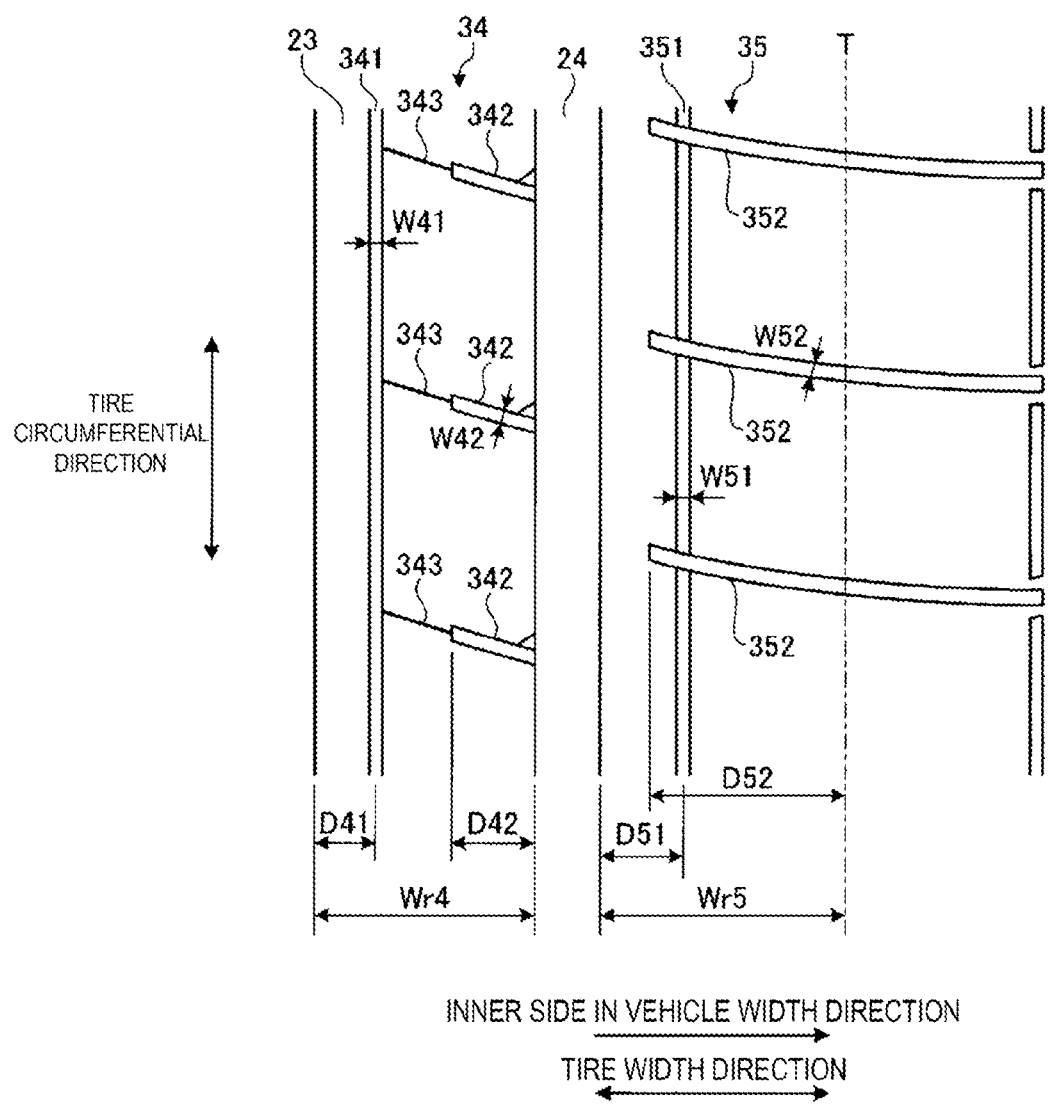
FIG. 5 is an enlarged view illustrating an inner region of the pneumatic tire illustrated in FIG. 2 in the vehicle width direction.
Figure 6:
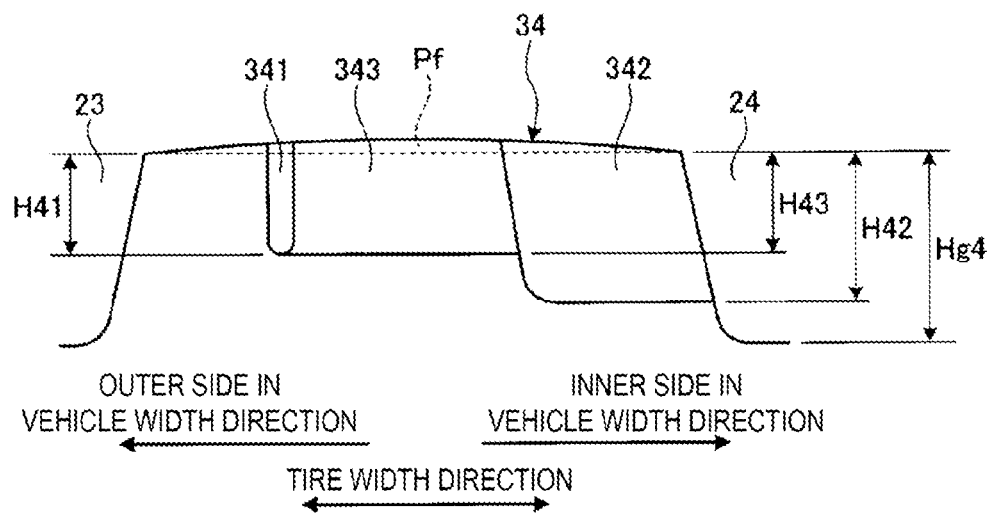
FIG. 6 is a cross-sectional view of the inner second land portion illustrated in FIG. 5 in the tire meridian direction.
Figure 7:
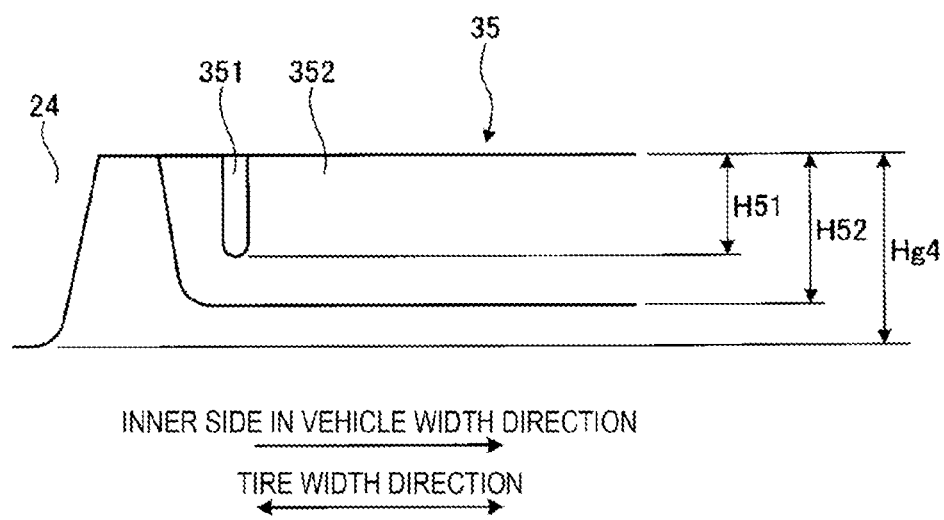
FIG. 7 is a cross-sectional view of the inner shoulder land portion described in FIG. 5 in the tire meridian direction.

FIG. 5 is an enlarged view illustrating the inner region in the vehicle width direction of the pneumatic tire illustrated in FIG. 2. FIG. 5 illustrates the inner second land portion 34 and the inner shoulder land portion 35. FIG. 6 is a cross-sectional view in the tire meridian direction of the inner second land portion illustrated in FIG. 5, and FIG. 7 is a cross-sectional view in the tire meridian direction of the inner shoulder land portion illustrated in FIG. 5.

The inner second land portion 34 includes a circumferential narrow groove 341, an inner second lug groove 342, and a sipe or narrow groove 343. Additionally, the edge portion on the outer side in the vehicle width direction of the inner second land portion 34 has a plain structure that is not divided into lug grooves or sipes.

The circumferential narrow groove 341 is a narrow groove extending in the tire circumferential direction, and in the configuration of FIG. 5, the circumferential narrow groove 341 has a straight shape with a constant groove width. Additionally, the groove width W41 of the circumferential narrow groove 341 is in the range of 1.0 mm or more and 2.0 mm or less. Additionally, the groove width W41 of the circumferential narrow groove preferably has a relationship of $0.03 \leq W41/Wr4 \leq 0.10$ with respect to the width Wr4 of the inner second land portion 34, and more preferably has a relationship of $0.04 \leq W41/Wr4 \leq 0.07$.

Additionally, the groove depth H41 (see FIG. 6) of the circumferential narrow groove 341 is in the range of 3.9 mm or more and 4.3 mm or less. The groove depth H41 of the circumferential narrow groove 341 has a relationship of $0.40 \leq H41/Hg4 \leq 0.60$ with respect to the groove depth Hg4 of the inner shoulder main groove 24.

Additionally, in the configuration of FIG. 5, the portion on the tire equatorial plane CL side of the inner second land portion 34 defined by the circumferential narrow groove 341 is a narrow rib (reference sign omitted in the drawings), and has a road contact surface continuous in the tire circumferential direction. Further, the left and right edge portions of the narrow rib, that is, the edge portion on the center main groove 23 side and the edge portion on the circumferential narrow groove 341 side have a plain structure that does not include the opening portion of lug grooves or sipes.

In the configuration described above, since the land portion (the inner second land portion 34) on the inner side in the vehicle width direction of the tread portion center region is provided with the circumferential narrow groove 341 that divides the land portion 33 in the tire width direction, the groove area of the inner region in the vehicle width direction, which greatly contributes to the drainage properties during traveling on wet road surfaces increases. As a result, the drainage properties of the tread portion center region are improved, and the wet performance of the tire is improved.

Additionally, the distance D41 from an edge portion on the tire equatorial plane CL side of the inner second land portion 34 to the groove center line of the circumferential narrow groove 341 preferably has a relationship of $0.20 \leq D41/Wr4 \leq 0.50$ with respect to the width Wr4 of the inner second land portion 34 and more preferably has a relationship of $0.25 \leq D41/Wr4 \leq 0.35$. Accordingly, the circumferential narrow groove 341 is disposed to be biased toward the tire equatorial plane CL side with respect to the center line of the inner second land portion 34.

The inner second lug groove 342 opens to the inner shoulder main groove 24 at one end and terminates in the inner second land portion 34 at the other end. The groove width W42 of the inner second lug groove 342 is in the range of 1.7 mm or more and 3.4 mm or less. The groove width W42 of the inner second lug groove 342 has a relationship of $0.90 \leq W42/W21 \leq 1.20$ with respect to the groove width W21 (see FIG. 4) of the first outer second lug groove 321. Thus, the first outer second lug groove 321 and the inner second lug groove 342 have substantially the same groove widths W21 and W42.

The groove depth H42 (see FIG. 6) of the inner second lug groove 342 is in the range of 5.9 mm or more and 6.5 mm or less. The groove depth H42 of the inner second lug groove 342 has a relationship of $1.40 \leq H42/H41 \leq 1.60$ with respect to the groove depth H41 of the circumferential narrow groove 341. The groove depth H42 of the inner second lug groove 342 has a relationship of $0.65 \leq H42/Hg4 \leq 0.80$ with respect to the groove depth Hg4 of the inner shoulder main groove 24. Therefore, the inner second lug groove 342 is deeper than the circumferential narrow groove 341 and shallower than the inner shoulder main groove 24.

The distance D42 from the edge portion on the outer side in the tire width direction of the inner second land portion 34 to the terminating end portion of the inner second lug groove 342 preferably has a relationship of $0.30 \leq D42/Wr4 \leq 0.50$ with respect to the width Wr4 of the inner second land portion 34, and more preferably has a relationship of $0.30 \leq D42/Wr4 \leq 0.40$. Thus, the inner second lug groove 342 does not intersect the circumferential narrow groove 341.

The distance D21 (see FIG. 4) of the first outer second lug groove 321 and the distance D42 of the inner second lug groove 342 preferably have a relationship of $1.01 \leq D42/D21 \leq 1.20$, and more preferably have a relationship of $1.02 \leq D42/D21 \leq 1.10$. Therefore, the distance D42 of the inner second lug groove 342 is preferably greater than the distance D21 of the first outer second lug groove 321 (D21 D41).

The distance D22 (see FIG. 4) of the second outer second lug groove 322 and the distance D42 of the inner second lug groove 342 preferably have a relationship of $1.01 \leq D42/D22 \leq 1.20$, and more preferably have a relationship of $1.02 \leq D42/D22 \leq 1.10$. Therefore, the distance D42 of the inner second lug groove 342 is preferably greater than the distance D22 of the second outer second lug groove 322 (D22<D41).

In the configuration described above, since the inner second land portion 34 includes the circumferential narrow groove 341 and the inner shoulder main groove 24, the drainage properties in the inner region in the vehicle width direction are improved. Additionally, since the outer second land portion 32 includes lug grooves 321 and 322 on the left and right edge portions, respectively, the drainage properties in the outer region in the vehicle width direction are improved. Since the lug grooves 321, 322, and 342 of the land portions 32 and 34 have a closed structure that terminates within the land portions, the rigidity of the land portions 32 and 34 is ensured. As a result, the wet performance and the dry steering stability performance of the tire are achieved in a compatible manner.

The sipe or narrow groove 343 connects the circumferential narrow groove 341 and the inner second lug groove 342 by extending from the inner second lug groove 342 and opening to the circumferential narrow groove 341. In the configuration of FIG. 5, the sipe or narrow groove 343 extends along the extension line of the groove center line of the inner second lug groove 342 and opens to the circumferential narrow groove 341. In such a configuration, since the sipe or narrow groove 343 connects the circumferential narrow groove 341 and the inner second lug groove 342, the drainage action from the circumferential narrow groove 341 to the inner second lug groove 342 during rolling of the tire is effectively obtained. As a result, the drainage properties in the inner region in the vehicle width direction are improved.

Additionally, the width W43 (dimension symbol omitted in the drawing) of the sipe or narrow groove 343 is in the range of 0.4 mm or more and 0.8 mm or less. Further, the depth H43 (see FIG. 6) of the sipe or the narrow groove 343 has a relationship of $0.90 \leq H43/H41 \leq 1.10$ with respect to the groove depth H41 of the circumferential narrow groove 341. Thus, the sipe or narrow groove 343 has the same depth with respect to the circumferential narrow groove 341.

The sipe width is measured as the maximum opening width of the sipe on the tread contact surface when the tire is mounted on a specified rim, inflated to a specified internal pressure, and in an unloaded state.

The sipe depth is measured as the distance from the tread contact surface to the maximum depth position of the sipe when the tire is mounted on a specified rim, inflated to a specified internal pressure, and in an unloaded state. Additionally, in a configuration in which a sipe includes a partially uneven portion on the groove bottom, the sipe depth is measured excluding this portion.

Additionally, in FIG. 2, the lug grooves 322 and 331 that open to the edge portions on the inner side in the vehicle width direction of the outer second land portion 32 and the center land portion 33 are disposed on an extension line of the lug groove 342 of the inner second land portion 34. Due to this, the drainage properties of the tread portion center region are enhanced. On the other hand, the lug groove 321 that opens to the edge portion on the outer side in the vehicle width direction of the outer second land portion 32 is disposed to be offset in the tire circumferential direction with respect to the lug groove 322 that opens to the edge portion on the inner side in the vehicle width direction. Due to this, the rigidity distribution of the outer second land portion 32 in the tire circumferential direction is made uniform, uneven wear of the land portions is suppressed, and pattern noise caused by the arrangement of the lug grooves 321 and 322 is reduced.

However, no such limitation is intended, and the lug grooves 322 and 331 of the outer second land portion 32 and the center land portion 33 may be disposed to be offset from the extension line of the lug groove 342 of the inner second land portion 34 (not illustrated). Additionally, both lug grooves 322 and 331 are preferably offset in the same direction in the tire circumferential direction with respect to the extension line of the lug groove 342 of the inner second land portion 34.

Additionally, the width Wr2 of the outer second land portion 32, the width Wr3 of the center land portion 33, and the width Wr4 of the inner second land portion 34 are preferably substantially the same. Specifically, the ratio of the widths Wr2 to Wr4 is preferably in the range of 95% or more and 105% or less. In particular, the width Wr3 of the center land portion 33 is in the range of 95% or more and 105% or less with respect to the width Wr2 of the outer second land portion 32 and the width Wr4 of the inner second land portion 34. As a result, the rigidity of the land portions 32 to 34 in the tread portion center region is made uniform, and the uneven wear resistance and uniformity of the tire are improved.

The inner shoulder land portion 35 includes a circumferential narrow groove 351 and an inner shoulder lug groove 352 (see FIG. 5).

The circumferential narrow groove 351 is a straight narrow groove extending in the tire circumferential direction, and is disposed to be offset toward the tire equatorial plane CL side with respect to the center line of the ground contact surface of the inner shoulder land portion 35. As a result, the groove area of the inner region in the vehicle width direction, which greatly contributes to the drainage properties during traveling on wet road surfaces, is increased, and the wet performance of the tire is improved. Additionally, the groove width W51 of the circumferential narrow groove 351 is in the range of 1.0 mm or more and 2.0 mm or less, and the groove depth H51 (see FIG. 7) is in the range of 3.9 mm or more and 4.3 mm or less. Additionally, the groove width W51 of the circumferential narrow groove 351 has a relationship of $0.10 \leq W51/Wg3 \leq 0.30$ with respect to the groove width Wg3 of the inner center main groove 23.

Additionally, in FIG. 5, the distance D51 from an edge portion on the inner shoulder main groove 24 side of the inner shoulder land portion 35 to the groove center line of the circumferential narrow groove 341 preferably has a relationship of $0.20 \leq D51/Wr5 \leq 0.40$ with respect to the width Wr5 of the inner shoulder land portion 35 and more preferably has a relationship of $0.25 \leq D51/Wr5 \leq 0.35$. Therefore, the circumferential narrow groove 341 is preferably disposed to be offset toward the inner shoulder main groove 24 side from the center line (not illustrated) of the ground contact surface of the inner shoulder land portion 35.

The inner shoulder lug groove 352 terminates inside the inner shoulder land portion 35 at one end and extends beyond the tire ground contact edge T in the tire width direction. Further, the inner shoulder lug groove 352 intersects the circumferential narrow groove 351 and terminates between the circumferential narrow groove 351 and the inner shoulder main groove 34. Further, the groove width W52 of the inner shoulder lug groove 352 is in the range of $1.0 \text{ mm} \leq W52 \leq 2.5 \text{ mm}$, and the groove depth H52 (see FIG. 7) is in the range of $5.9 \text{ mm} \leq H52 \leq 6.5 \text{ mm}$. Therefore, the inner shoulder lug groove 352 is a so-called narrow groove. Additionally, as illustrated in FIG. 7, the circumferential narrow groove 351 is shallower than the inner shoulder lug groove 352.

Additionally, the inner shoulder land portion 35 has a narrow rib (reference sign omitted in the drawings) defined by the circumferential narrow groove 351 and having a road contact surface continuous in the tire circumferential direction, provided on the edge portion on the inner shoulder main groove 24 side. Additionally, the edge portion on the inner shoulder main groove 24 side of the inner shoulder land portion 35 has a plain structure that is not divided into lug grooves or sipes.

As illustrated in FIG. 4, the lug groove 342 of the inner second land portion 34 and the lug groove 352 of the inner shoulder land portion 35 are inclined in the same direction with respect to the tire circumferential direction. In FIG. 4, all the lug grooves 342 and 352 extend in a state of being inclined downward to the right. Furthermore, as illustrated in FIG. 2, all the lug grooves 311, 321, 322, 331, 342, and 352 in the entire tread are inclined in the same direction with respect to the tire circumferential direction.

Additionally, in FIG. 2, the pneumatic tire 1 has a pitch variation structure formed by periodically changing the pitch length of the lug grooves in the tire circumferential direction. Specifically, each of the lug grooves 311, 321, 322, 331, 342, and 352 of the land portions 31 to 35 is arranged in the tire circumferential direction in a predetermined pitch arrangement consisting of three to seven types of pitch lengths. In such a pitch variation structure, pattern noise caused by the arrangement of the lug grooves is reduced, and the noise performance of the tire is improved.

Additionally, in FIG. 2, the pitch number N1 of the outer shoulder lug groove 311 in the outer shoulder land portion 31 has a relationship of $0.95 \leq N1/N5 \leq 1.05$ with respect to the pitch number N5 of the inner shoulder lug groove 352 in the inner shoulder land portion 35. Accordingly, the pitch numbers N1 and N5 of the outer and inner shoulder lug grooves 311, 352 are set to be substantially the same. The pitch number N1 of the outer shoulder lug groove 311 is in the range of 66 or more and 74 or less.

The maximum value P1_max of the pitch length P1 (see FIG. 2) of the outer shoulder lug groove 311 has a relationship of $0.95 \leq P1\_max/P5\_max \leq 1.05$ with respect to the pitch length P5_max of the inner shoulder lug groove 352 at the same position in the tire circumferential direction. Accordingly, the pitch lengths P1 and P5 of the outer and inner shoulder lug grooves 311 and 352 are set to be substantially the same. In such a configuration, as compared with a configuration in which the outer and inner shoulder lug grooves 311 and 352 at the same position in the tire circumferential direction are disposed at different pitch lengths, the pass-by noise of the vehicle is reduced when a section with a particularly large pitch length is grounded.

Furthermore, the minimum value P1_min of the pitch length P1 (see FIG. 2) of the outer shoulder lug groove 311 preferably has a relationship of $0.95 \leq P1\_min/P5\_min \leq 1.05$ with respect to the minimum value P5_min of the pitch length of the inner shoulder lug groove 352. The pitch length P1 of the outer shoulder lug groove 311 is preferably in the range of 41 mm or more and 22 mm or less.

The inner shoulder lug grooves at the same position in the tire circumferential direction are defined as the inner shoulder lug grooves having the shortest relative distance in the tire circumferential direction with respect to any outer shoulder lug groove.

Further, the groove width W11_max of the widest shoulder lug groove 311 and the groove width W11_min of the narrowest shoulder lug groove 311 among the plurality of outer shoulder lug grooves 311 have a relationship of $1.00 \leq W11\_max/W11\_min \leq 1.05$. Similarly, the groove width W52_max of the widest shoulder lug groove 352 and the groove width W52_min of the narrowest shoulder lug groove 352 among the plurality of inner shoulder lug grooves 352 have a relationship of 1.00≤W52_max/W52_min≤1.05. In other words, as described above, in a configuration in which the outer and inner shoulder lug grooves 311 and 352 are arranged in the tire circumferential direction with a plurality of types of pitch lengths, the groove widths W11 and W52 of the shoulder lug grooves 311 and 352 are set to be substantially constant.

Furthermore, the groove width W11 of the outer shoulder lug groove 311 has a relationship of 0.95≤W11/W52≤1.05 with respect to the groove width W52 of the inner shoulder lug groove 352. Accordingly, the groove widths W11 and W52 of the outer and inner shoulder lug grooves 311 and 352 are set to be substantially the same as each other.

Chamfered Portion of Shoulder Lug Groove

Figure 8:
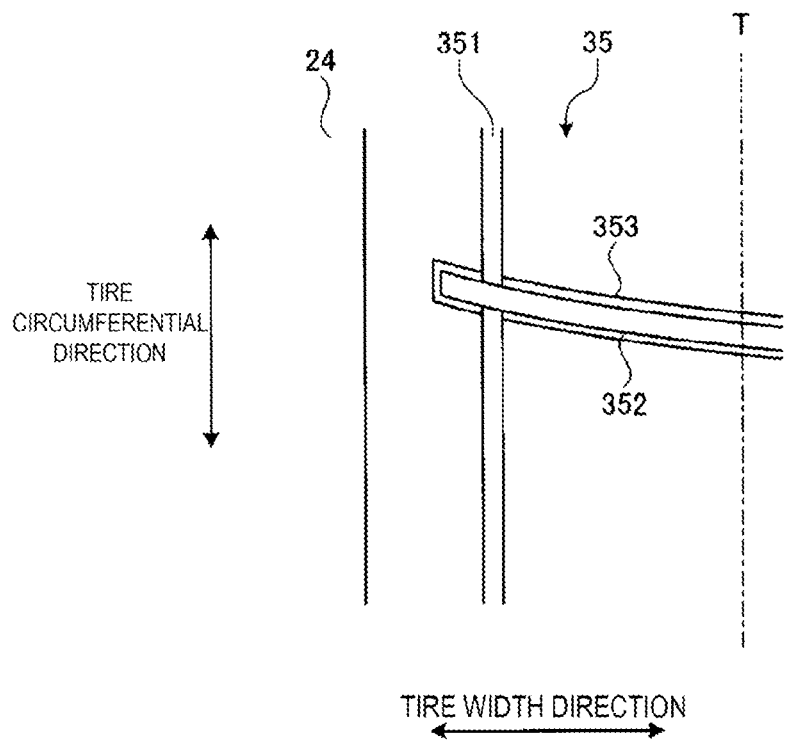
FIG. 8 is an explanatory diagram illustrating a chamfered portion of the shoulder lug groove illustrated in FIG. 5.
Figure 9:
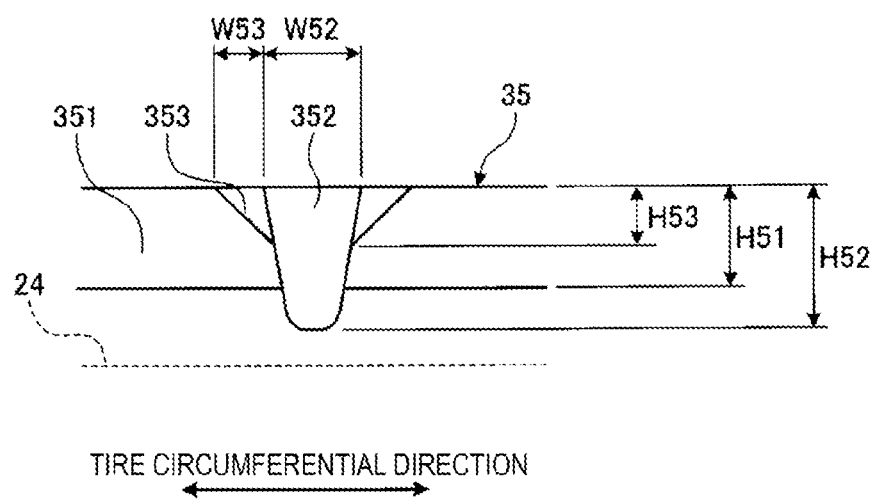
FIG. 9 is an explanatory diagram illustrating a chamfered portion of the shoulder lug groove illustrated in FIG. 5.

FIGS. 8 and 9 are explanatory diagrams illustrating a chamfered portion of the shoulder lug groove illustrated in FIG. 5. In these drawings, FIG. 8 illustrates an enlarged plan view of the shoulder lug groove 352, and FIG. 9 illustrates a cross-sectional view in a groove depth direction along the circumferential narrow groove 351.

In the configuration of FIG. 2, each of the outer shoulder land portion 31 and the inner shoulder land portion 35 is provided with a plurality of shoulder lug grooves 311 and 352, respectively. At this time, at least one of the outer shoulder land portion 31 and the inner shoulder land portion 35 is preferably provided with a chamfered portion in the opening portion of the shoulder lug groove 311 or 352 on the tread contact surface. In such a configuration, since the groove volume of the shoulder lug groove 352 is enlarged by the chamfered portion 353, the drainage properties of the shoulder lug grooves 311 and 352 are improved. Here, as an example, a configuration in which the inner shoulder land portion 35 includes the chamfered portion 353 in the groove opening portion of the shoulder lug groove 352 (see FIG. 8) will be described.

In the configuration illustrated in FIG. 8, the chamfered portion 353 is formed in the tire ground contact surface so as to surround the entire circumference of the groove opening portion of the shoulder lug groove 352. Specifically, the chamfered portion 353 extends along the front and rear edge portions of the shoulder lug groove 352 in the tire circumferential direction, and surrounds the terminating end portions of the shoulder lug groove 352. However, no such limitation is intended, and the chamfered portions 353 may be formed on only one side of the edge portions of the shoulder lug groove 352 in the tire circumferential direction, or may not be formed at the terminating end portions of the shoulder lug groove 352 (not illustrated).

Additionally, in FIG. 9, the width W53 of the chamfered portion 353 preferably has a relationship of 0.25≤W53/W52≤0.40 with respect to the width W52 of the shoulder lug groove 352. Additionally, the width W53 of the chamfered portion 353 is preferably in the range of 0.3 mm≤W53≤0.7 mm. The depth H53 of the chamfered portion 353 preferably has a relationship of 0.14≤H53/H52≤0.17 with respect to the depth H52 of the shoulder lug groove 352. Further, in the configuration of FIG. 9, the depth H51 of the circumferential narrow groove 351 is shallower than the depth H52 of the shoulder lug groove 352, and the depth H53 of the chamfered portion 353 is shallower than the depth H51 of the circumferential narrow groove 351 (H53<H51<H52).

The width of the chamfered portion is measured as the maximum width of the chamfered portion on the tread contact surface. Additionally, the intersection point between the extension line of the tread contact surface and the extension line of the groove wall surface of the lug groove is used as the measurement point of the width of the chamfered portion.

The depth of the chamfered portion is measured as the distance from the tread contact surface to the maximum depth position of the chamfered portion.

MODIFIED EXAMPLES

Figure 10:
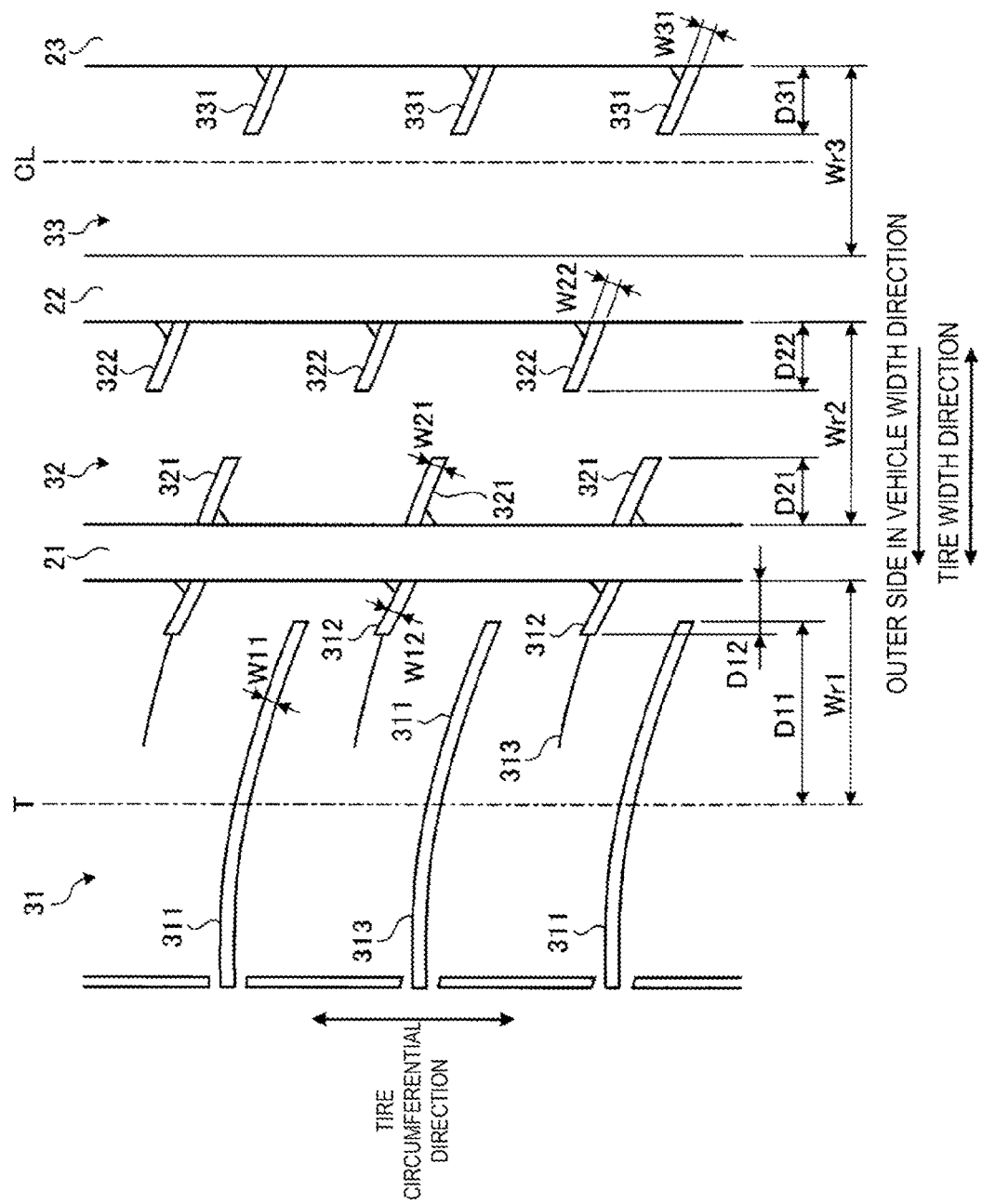
FIG. 10 is an explanatory diagram illustrating a modified example of the pneumatic tire illustrated in FIG. 2.

FIG. 10 is an explanatory diagram illustrating a modified example of the pneumatic tire illustrated in FIG. 2. FIG. 2 illustrates a plan view of an inner region in the vehicle width direction of the tread portion.

In the configuration of FIG. 2, as illustrated in FIG. 4, the edge portion on the outer shoulder main groove 21 side of the outer shoulder land portion 31 has a plain structure that is not divided into lug grooves or sipes. Such a configuration is preferable in that the rigidity of the outer shoulder land portion 31 increases and the turning performance of the tire is improved.

In contrast, in the configuration of FIG. 10, the outer shoulder land portion 31 includes the outer shoulder lug groove 311, the second outer shoulder lug groove 312, and the sipe 313.

The second outer shoulder lug groove 312 is formed in the edge portion on the outer shoulder main groove 21 side, terminates in the outer shoulder land portion 31 at one end, and opens to the outer shoulder main groove 21 at the other end. Further, the first outer shoulder lug groove 311 and the second outer shoulder lug groove 312 are alternately arranged in the tire circumferential direction. The second outer shoulder lug groove 312 is disposed on an extension line (not illustrated) of the groove center line of the first outer second lug groove 321 of the outer second land portion 32. Thus, the second outer shoulder lug groove 312 is inclined in the same direction as the first outer second lug groove 321.

Additionally, the groove width W12 (see FIG. 10) of the second outer shoulder lug groove 312 preferably has a relationship of 0.95≤W12/W11≤1.05 with respect to the groove width W11 of the first outer shoulder lug groove 311. Further, the groove depth H12 (not illustrated) of the second outer shoulder lug groove 312 preferably has a relationship of 0.95≤H12/H11≤1.05 with respect to the groove depth H11 of the first outer shoulder lug groove 311. Thus, the first and second shoulder lug grooves 311 and 312 have substantially the same groove width and groove depth.

Further, the distance D12 from the edge portion of the outer shoulder land portion 31 on the outer shoulder main groove 21 side to the terminating end portion of the second outer shoulder lug groove 312 preferably has a relationship of 0.15≤D12/Wr1≤0.25 with respect to the width Wr1 of the outer shoulder land portion 31, and more preferably has a relationship of 0.18≤D12/Wr1≤0.20. Further, the first and second shoulder lug grooves 311 and 312 may overlap each other in the tire width direction (see FIG. 10), or may not overlap (not illustrated).

Furthermore, the outer shoulder land portion 31 includes sipes 313 that extend in the tire width direction from the terminating end portion of the second outer shoulder lug groove 312. For example, in the configuration of FIG. 10, the sipes 313 extend along the groove center line of the second outer shoulder lug groove 312 to extend the second outer shoulder lug groove 312. As a result, the wet performance of the tire is improved.

Effect

As described above, the pneumatic tire 1 has an indicator designating a mounting direction with respect to the vehicle and includes the outer shoulder main groove 21, the outer center main groove 22, the inner center main groove 23, and the inner shoulder main groove 24 extending in the tire circumferential direction, and the outer shoulder land portion 31, the outer second land portion 32, the center land portion 33, the inner second land portion 34, and the inner shoulder land portion 35 defined by these main grooves 21 to 24 (see FIG. 2). Further, the outer second land portion 32, the center land portion 33, and the inner second land portion 34 have a road contact surface that partially bulges toward the outer side in the tire radial direction from the reference contour line of the tread profile in the cross-sectional view in the tire meridian direction (See FIG. 3). Additionally, a groove width Wg1 of the outer shoulder main groove 21, a groove width Wg3 of the inner center main groove 23, and a groove width Wg4 of the inner shoulder main groove 24 have a relationship of Wg3<Wg1<Wg4, 1.05≤Wg1/Wg3≤1.25, and 1.10≤Wg4/Wg3≤1.30.

In such a configuration, (1) since the land portions 32 to 34 of the tread portion center region include the bulging road contact surface, the ground contact pressure in the tread portion center region increases. As a result, the grounding characteristics between the road contact surface of the land portions 32 to 34 and the road surface during traveling on wet road surfaces are improved, and the wet performance of the tire is improved.

Additionally, (2) the groove width Wg1 of the outer shoulder main groove 21, the groove width Wg3 of the inner center main groove 23, and the groove width Wg4 of the inner shoulder main groove 24 have a relationship of Wg3<Wg1<Wg4, 1.05≤Wg1/Wg3≤1.25, and 1.10≤Wg4/Wg3≤1.30 (see FIG. 3). In the configuration described above, since the groove width Wg3 of the inner center main groove 23 is narrow, the rigidity of the land portions 33 and 34 in the inner region in the tire width direction is ensured, and the steering stability performance of the tire on dry road surfaces is improved. On the other hand, since the groove width Wg4 of the inner shoulder main groove 24 is wide, the drainage properties in the inner region in the tire width direction is ensured, and the wet performance of the tire is ensured.

Due to (1) and (2) described above, an advantage that the wet performance and the dry steering stability performance of the tire are improved in a compatible manner is obtained.

Additionally, in the pneumatic tire 1, the groove width Wg2 of the outer center main groove 22 has a relationship of 1.05≤Wg2/Tg3≤1.40 with respect to the groove width Wg3 of the inner center main groove 23 (see FIG. 3). In such a configuration, since the groove width Wg2 of the outer center main groove 22 is wider than the groove width Wg3 of the inner center main groove 23 (Wg3<Wg2), an advantage that the pass-by noise of the vehicle is reduced as compared with a configuration in which the outer center main groove 22 has a narrow width structure is provided.

Further, in the pneumatic tire 1, the groove width Wg2 of the outer center main groove 22 has a relationship of Wg1<Wg2 and 0.01≤(Wg2−Wg1)/Wg3 with respect to the groove width Wg1 of the outer shoulder main groove 21 and the groove width Wg3 of the inner center main groove 23 (see FIG. 3). In the configuration described above, the groove width Wg2 of the outer center main groove 22 is wider than the groove width Wg1 of the outer shoulder main groove 21 on the outermost side in the vehicle width direction (Wg1<Wg2), an advantage that the pass-by noise of the vehicle is reduced as compared with a configuration in which the outer center main groove 22 has a narrow width structure is obtained.

Additionally, in the pneumatic tire 1, the groove widths Wg1 to Wg4 of the four main grooves 21 to 24 are different from each other. As a result, an advantage that air column resonance sound passing through the main grooves 21 to 24 is dispersed and the pass-by noise of the vehicle is reduced is obtained.

Additionally, in the pneumatic tire 1, each of the outer shoulder land portion 31 and the inner shoulder land portion 35 includes a plurality of shoulder lug grooves 311 and 352 that terminate inside the land portion at one end and extend beyond the tire ground contact edge T in the tire width direction (see FIG. 5). In such a configuration, since the outer and inner shoulder land portions 31 and 35 are provided with the non-penetrating lug grooves 311 and 352, an advantage that the pass-by noise of the vehicle is reduced as compared with a configuration in which the shoulder land portions 31 and 35 include penetrating lug grooves (not illustrated) is obtained.

In addition, in the pneumatic tire 1, in a configuration in which the maximum value P1_max of the pitch length P1 (see FIG. 2) of the outer shoulder lug groove 311 has a relationship of 0.95≤P1_max/P5_max≤1.05 with respect to the pitch length P5_max of the inner shoulder lug groove 352 at the same position in the tire circumferential direction, the pitch lengths P1 and P5 of the outer and inner shoulder lug grooves 311 and 352 are set to be substantially the same. Therefore, an advantage that the pass-by noise of the vehicle when a section with a particularly large pitch length is grounded is reduced as compared with a configuration in which the outer and inner shoulder lug grooves 311 and 352 at the same position in the tire circumferential direction are disposed at different pitch lengths is obtained.

Additionally, in the pneumatic tire 1, the outer shoulder land portion 31 includes a plurality of shoulder lug grooves 311 (see FIG. 2), and the groove width W11 (see FIG. 4) of the shoulder lug groove 311 is in the range of 1.0 mm≤W11≤2.5 mm. In such a configuration, since the outer shoulder lug groove 311 is a so-called narrow groove, an advantage that the pass-by noise of the vehicle is reduced as compared with a configuration in which the outer shoulder lug groove 311 has a wide structure is obtained.

Further, in the pneumatic tire 1, the outer shoulder land portion 31 includes a plurality of shoulder lug grooves 311 arranged in the tire circumferential direction with a plurality of types of pitch lengths P1 (see FIG. 2). The groove width W11_max of the widest shoulder lug groove 311 and the groove width W11_min of the narrowest shoulder lug groove 311 have a relationship of 1.00≤W11_max/W11_min≤1.05. In such a configuration, since the groove width W11 of the outer shoulder lug groove 311 is made uniform, an advantage that the pass-by noise of the vehicle is reduced is obtained.

Further, in the pneumatic tire 1, each of the outer shoulder land portion 31 and the inner shoulder land portion 35 includes a plurality of shoulder lug grooves 311 and 352, respectively (see FIG. 2). Further, the groove width W11 of the shoulder lug groove 311 in the outer shoulder land portion 31 has a relationship of 0.95≤W11/W52≤1.05 with respect to the groove width W52 of the shoulder lug groove 352 in the inner shoulder land portion 352. In such a configuration, since the groove widths W11 and W52 of the outer and inner shoulder lug grooves 311 and 352 are set to be substantially the same, an advantage that the pass-by noise of the vehicle is reduced is obtained.

Further, in the pneumatic tire 1, each of the outer shoulder land portion 31 and the inner shoulder land portion 35 includes a plurality of shoulder lug grooves 311 and 352, respectively (see FIG. 2). Further, the shoulder lug groove 311 is provided with the chamfered portion 353 in the opening portion of the tread contact surface (see FIG. 8). In such a configuration, since the chamfered portion 353 expands the groove volume of the shoulder lug groove 352, an advantage that the drainage properties of the shoulder lug grooves 311 and 352 are improved is obtained.

Additionally, in the pneumatic tire 1, the inner shoulder land portion 31 includes the circumferential narrow groove 351 that divides the inner shoulder land portion 35 in the tire width direction (see FIG. 2). In such a configuration, since the groove area of the inner region in the vehicle width direction that greatly contributes to the drainage properties when traveling on wet road surfaces is increased, an advantage that the wet performance of the tire is improved is obtained. In particular, when the tire is mounted on a wheel set to a negative camber, since the groove area in the inner region of the tread portion that comes into contact with the ground widely even when the vehicle goes straight is increased, the effect of improving the wet performance of the tire is effectively obtained.

Additionally, in the pneumatic tire 1, the groove width W51 (see FIG. 5) of the circumferential narrow groove 351 has a relationship of $0.10 \leq W51/Wg3 \leq 0.30$ with respect to the groove width Wg3 of the inner center main groove 23. Due to the lower limit, the groove width W51 of the circumferential narrow groove 351 is ensured, and the effect of improving the wet performance due to the circumferential narrow groove 351 is appropriately ensured. Due to the upper limit, an advantage that degradation of the noise performance of the tire due to the widening of the circumferential narrow groove 351 is suppressed is obtained.

Additionally, in the pneumatic tire 1, the distance D51 from the edge portion on the inner shoulder main groove 24 side of the inner shoulder land portion 35 to the groove center line of the circumferential narrow groove 351 has a relationship of $0.20 \leq D51/Wr5 \leq 0.40$ with respect to the width Wr5 of the inner shoulder land portion 351 (see FIG. 5). As a result, an advantage that the distance D51 of the circumferential narrow groove 351 is optimized is obtained.

Additionally, in the pneumatic tire 1, the portion on the inner shoulder main groove 24 side of the inner shoulder land portion 35 defined by the circumferential narrow groove 351 is a narrow rib (reference sign omitted in the drawings) having a road contact surface continuous in the tire circumferential direction (see FIG. 5). In such a configuration, an advantage that the rigidity of the inner shoulder land portion 35 is appropriately ensured as compared with a configuration in which the portions defined by the circumferential narrow groove 351 are rows of blocks divided in the tire circumferential direction by lug grooves or sipes is obtained.

Further, in the pneumatic tire 1, the outer shoulder land portion 31 and the inner shoulder land portion 35 do not have the bulging road contact surface (see FIG. 3). In such a configuration, since the land portions 32 to 34 in the tread portion center region have the bulging road contact surface, while the land portions 31 and 35 in the tread portion shoulder regions do not have the bulging road contact surface, the ground contact pressure difference between the tread portion shoulder region and the center region to which load is applied during cornering is made uniform. Due to this, an advantage of improving dry steering stability during cornering is obtained.

EXAMPLES

FIGS. 11A-11C are tables showing results of performance tests of pneumatic tires according to embodiments of the technology.

In the performance tests, (1) wet braking performance, (2) dry steering stability performance, and (3) noise performance are evaluated for a plurality of types of test tires. Additionally, test tires having a tire size of 225/65R17 102H are assembled on a rim having a rim size of 17×6.5J, and an internal pressure of 230 kPa and a load specified by JATMA are applied to the test tires. The test tires are mounted on all wheels of an FF (Front-engine Front-drive)-type CUV (Crossover Utility Vehicle) with an engine displacement of 2400 cc, which is the test vehicle.

(1) In the evaluation of wet braking performance, the test vehicle is driven on an asphalt road surface sprayed with a water depth of 1 mm and the braking distance from an initial speed of 100 km/h is measured. Evaluation was carried out by expressing the measurement results as index values with the results of Conventional Example being defined as the reference (100). In the evaluation, larger values are preferable.

(2) In the evaluation of steering stability performance, the test vehicle travels at a speed of 60 km/h to 100 km/h on a test course of dry road surfaces having a flat circuit. Then the test driver performed a sensory evaluation regarding steering while lane changing and cornering and stability while traveling forward. Results of the evaluation are expressed as index values and evaluated with the Conventional Example being assigned as the reference (100). In this evaluation, larger values are preferable.

(3) In the evaluation of noise performance, the pass-by noise of the vehicle is measured according to the test conditions specified in R117-2 of ECE (Economic Commission for Europe), and the results of evaluation are expressed as index values and evaluated with Conventional Example being assigned as the reference (100). In this evaluation, larger values are preferable.

The test tires of Examples have the configuration illustrated in FIGS. 1 to 3, in which the groove depth of the main grooves 21 to 24 is 8.1 mm, and the groove width Wg3 of the narrowest main groove 23 is 8.9 mm. Additionally, the land portions 32 to 34 in the tread portion center region have a road contact surface that bulges from the reference contour line Pf of the tread profile, and the bulging amounts G2 to G4 are 0.3 mm. Additionally, the widths Wr1 and Wr5 of the land portions in the tread portion shoulder regions are 38.5 mm, and the widths Wr2, Wr3, and Wr4 in the land portions 32 to 34 in the tread portion center region are 22.5 mm. Additionally, the groove widths W41 and W51 of the circumferential narrow grooves 341 and 351 are 1.5 mm, and the groove depths H41 and H51 are 4.0 mm.

The test tire of Conventional Example has a tread pattern similar to that of Japanese Patent No. 5790876, and both tires are different in that, in the configuration of FIGS. 1 to 3, (1) the outer shoulder lug groove 511 passes through the outer shoulder land portion 31, (2) the outer second land portion 32 does not include the first outer second lug groove 321, (3) the inner second land portion 34 does not include the circumferential narrow groove 341 and the sipe 343, and (4) the inner shoulder land portion 35 does not include the circumferential narrow groove 351.

As can be seen from the test results, it is understood that the wet braking performance, the dry steering stability performance, and the noise performance of the test tires of Examples are improved.

The invention claimed is:

1. A pneumatic tire having an indicator designating a mounting direction with respect to a vehicle, the pneumatic tire comprising:
    an outer shoulder main groove, an outer center main groove, an inner center main groove, and an inner shoulder main groove extending in a tire circumferential direction; and
    an outer shoulder land portion, an outer second land portion, a center land portion, an inner second land portion, and an inner shoulder land portion defined by the main grooves,
    the outer second land portion, the center land portion, and the inner second land portion comprising a road contact surface that partially bulges toward an outer side in a tire radial direction from a reference contour line of a tread profile in a cross-sectional view in a tire meridian direction, and
    a groove width Wg1 of the outer shoulder main groove, a groove width Wg3 of the inner center main groove, and a groove width Wg4 of the inner shoulder main groove having a relationship of Wg3<Wg1<Wg4, 1.05≤Wg1/Wg3≤1.25, and 1.10≤Wg4/Wg3≤1.30.

2. The pneumatic tire according to claim 1, wherein a groove width Wg2 of the outer center main groove has a relationship of 1.05≤Wg2/Wg3≤1.40 with respect to the groove width Wg3 of the inner center main groove.

3. The pneumatic tire according to claim 1, wherein a groove width Wg2 of the outer center main groove has a relationship of Wg1<Wg2 and 0.01≤(Wg2−Wg1)/Wg3 with respect to the groove width Wg1 of the outer shoulder main groove and the groove width Wg3 of the inner center main groove.

4. The pneumatic tire according to claim 1, wherein the groove widths of the four main grooves are different from each other.

5. The pneumatic tire according to claim 1, wherein each of the outer shoulder land portion and the inner shoulder land portion is provided with a plurality of shoulder lug grooves that terminate inside the land portion at one end and extend beyond a tire ground contact edge in a tire width direction.

6. The pneumatic tire according to claim 1, wherein
    each of the outer shoulder land portion and the inner shoulder land portion is provided with a plurality of shoulder lug grooves, and
    a maximum value P1_max of a pitch length P1 of the outer shoulder lug groove has a relationship of 0.95≤P1_max/P5_max≤1.05 with respect to a pitch length P5_max of the inner shoulder lug groove at a same position in the tire circumferential direction.

7. The pneumatic tire according to claim 1, wherein the outer shoulder land portion is provided with a plurality of shoulder lug grooves, and a groove width W11 of the shoulder lug groove is in a range of 1.0 mm≤W11≤2.5 mm.

8. The pneumatic tire according to claim 1, wherein
    the outer shoulder land portion is provided with a plurality of shoulder lug grooves arranged in the tire circumferential direction with a plurality of types of pitch lengths, and
    a groove width W11_max of the shoulder lug groove that is widest and a groove width W11_min of the shoulder lug groove that is narrowest have a relationship of 1.00≤W11_max/W11_min≤1.05.

9. The pneumatic tire according to claim 1, wherein
    each of the outer shoulder land portion and the inner shoulder land portion is provided with a plurality of shoulder lug grooves, and
    a groove width W11 of the shoulder lug groove in the outer shoulder land portion has a relationship of 0.95≤W11/W52≤1.05 with respect to a groove width W52 of the shoulder lug groove in the inner shoulder land portion.

10. The pneumatic tire according to claim 1, wherein
    each of the outer shoulder land portion and the inner shoulder land portion is provided with a plurality of shoulder lug grooves, and
    the shoulder lug groove is provided with a chamfered portion at an opening portion of a tread contact surface.

11. The pneumatic tire according to claim 1, wherein the bulging road contact surface is not present on the outer shoulder land portion and the inner shoulder land portion.

12. The pneumatic tire according to claim 1, wherein the inner shoulder land portion is provided with a circumferential narrow groove that divides the inner shoulder land portion in a tire width direction.

13. The pneumatic tire according to claim 12, wherein a groove width W51 of the circumferential narrow groove has a relationship of 0.10≤W51/Wg3≤0.30 with respect to the groove width Wg3 of the inner center main groove.

14. The pneumatic tire according to claim 12, wherein a distance D51 from an edge portion of the inner shoulder land portion on the inner shoulder main groove side to a groove center line of the circumferential narrow groove has a relationship of 0.20≤D51/Wr5≤0.40 with respect to a width Wr5 of the inner shoulder land portion.

15. The pneumatic tire according to claim 12, wherein a portion of the inner shoulder land portion on the inner shoulder main groove side defined by the circumferential narrow groove is a narrow rib comprising a road contact surface continuous in the tire circumferential direction.

* * * * *